Feb. 6, 1934.  W. N. (TAMPTON) AUBUCHON, JR  1,945,722
METHOD OF AND APPARATUS FOR PRODUCING MOTION PICTURES
Filed Sept. 9, 1932  2 Sheets-Sheet 1
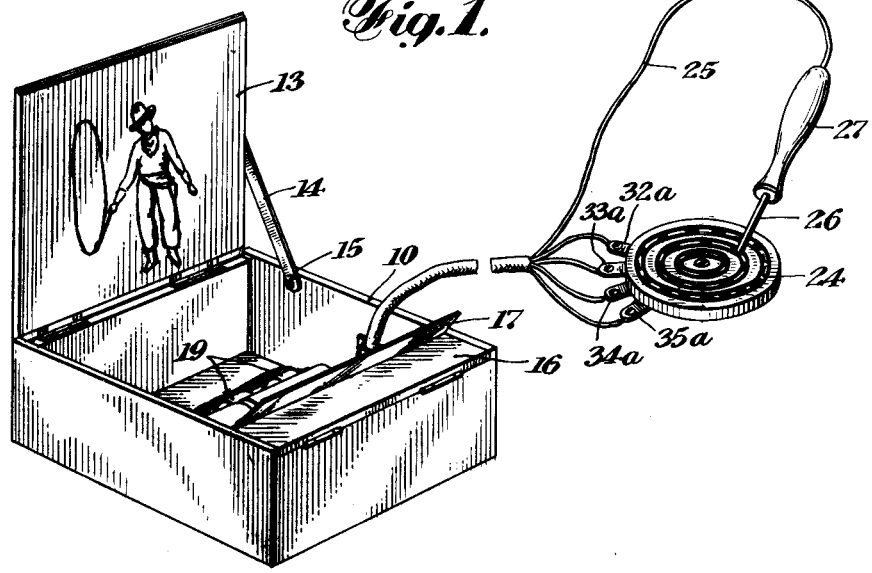
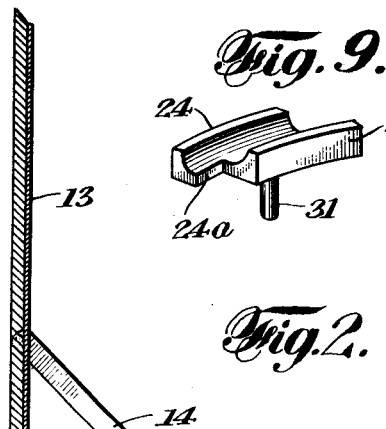
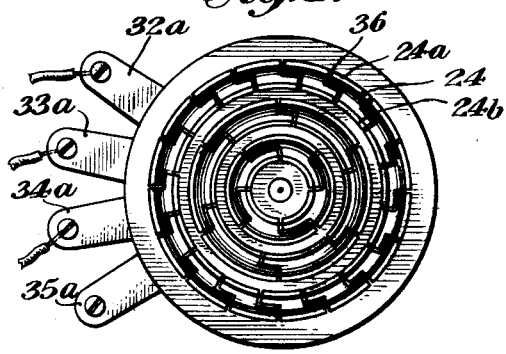
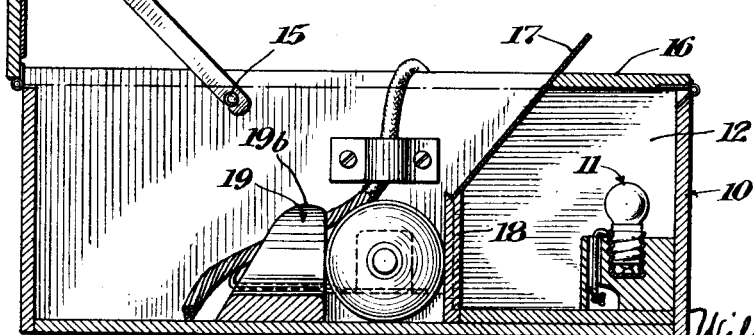

Feb. 6, 1934.  W. N. (TAMPTON) AUBUCHON, JR  1,945,722
METHOD OF AND APPARATUS FOR PRODUCING MOTION PICTURES
Filed Sept. 9, 1932  2 Sheets-Sheet 2
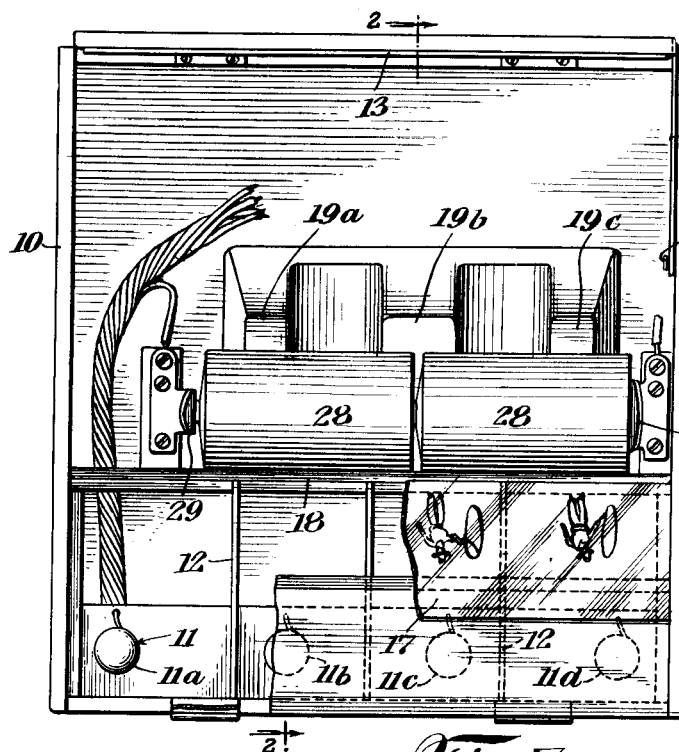
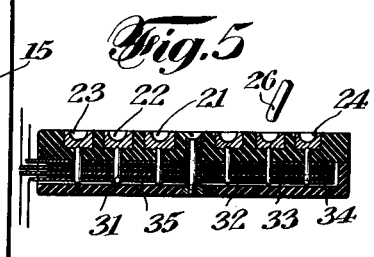
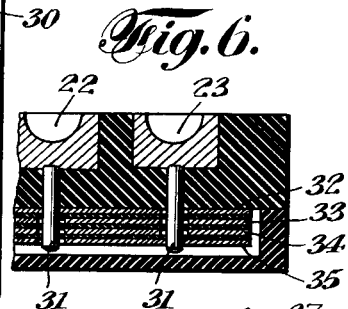
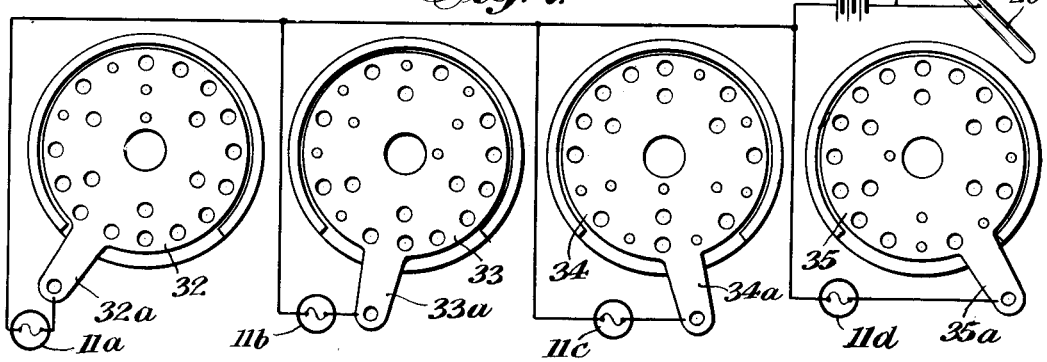
INVENTOR
William N. (Tampton) Aubuchon, Jr.
BY
Prindle, Bean & Mann
ATTORNEY Patented Feb. 6, 1934

1,945,722

UNITED STATES PATENT OFFICE 1,945,722

METHOD OF AND APPARATUS FOR PRODUCING MOTION PICTURES

William N. (Tampton) Aubuchon, Jr., New York, N. Y.

Application September 9, 1932. Serial No. 632,352

18 Claims. (Cl. 40—130)

The object of my invention has been to provide an improved method and apparatus, by which motion picture effects can be produced, which shall be capable of producing the effect or illusion of a person or animal walking across a screen, or of an inanimate object, such as a train, aeroplane, or motorboat, and which shall also be capable, if desired, of making a single set of pictures representing, for instance, a cowboy swinging a lasso, appear to change at will, from one stunt to another, without changing the set of pictures itself.

My said apparatus also comprises a method of and commutator for motion pictures, by which the successive images can be made to succeed each other without interrupting the light during the transition from one to another, thereby producing a smooth effect, of continuous lighting, and relieving the eyes of the strain from the flash-on-and-off of the light, which occurs in the common motion picture projectors, to the great discomfort of the observer. In the making of the said successive images, however, the light may be interrupted if it is desired. To such ends, my invention consists in the method of and apparatus for producing motion pictures, hereinafter specified.

While I have chosen for illustrating my invention, the best apparatus known to me, my invention is capable of practice and embodiment both as to the method and the apparatus in many different ways. The illustrative form is, therefore, to be taken only as typical of the many different embodiments of which my invention is capable, and my invention is not to be confined thereto.

In the accompanying drawings:

Fig. 1 is a perspective view of one form of apparatus embodying my invention.

Fig. 2 is a vertical sectional view of said apparatus taken on the line 2—2 of Fig. 4.

Fig. 3 is a plan view of the commutator shown in Fig. 1.

Fig. 4 is a plan view of the apparatus shown in Figs. 1 and 2.

Fig. 5 is a vertical section of the complete commutator shown in Figs. 2 and 3.

Fig. 6 is an enlarged vertical section of a portion of the commutator shown in Fig. 5.

Fig. 7 is a plan view showing the four separate plates contained in the said commutator, each of which is connected with one of the electric light bulbs shown in my motion picture projector.

Fig. 8 is a plan view of a film or plate 17 having shown thereon, 4 figures of a cowboy whirling his lasso.

Fig. 9 is a perspective view of one of the commutator blocks with its contact pin.

Fig. 10 is a plan view of the film or plate 17 having groups of camels thereon, for the purpose of creating the illusion of an endless line of camels walking across the film.

In the accompanying drawings, the apparatus comprises a box 10, having a series of electric bulbs, 11, mounted therein, the bulbs preferably being separated from each other by partitions 12, so that the light of a bulb will shine substantially only toward a screen 13, which, in the present instance, is supported at the opposite end of the box from the row of lights. The screen is preferably hinged to the box and is provided with a strut or link 14, which is adapted, by a notch formed therein, to engage a screw 15, fastened in the box, and hold the screen in an upright position. At the end of the box where the electric bulbs are, a short cover section 16 is hinged to the box so that, in its hinged position, it will extend over the bulbs and prevent their light from shining upward, and yet it can be turned up out of the way when it is necessary to adjust or replace one of the said bulbs.

The images to be projected upon the screen are formed on a film 17, which for convenience is supported on a rack 18 and against the adjacent edge of the short cover section so that it will be in a position inclined to the vertical at such an angle that the light from the bulbs, when passing through the figures or pictures, will strike the portion of the screen where it is desired to have the said figures appear. By this arrangement, the only part of the apparatus which it is necessary to adjust, in order to put it into operation, is the large cover section, or screen 13; and no other part of the box need project outside of the limits of the box.

In Fig. 8 of the drawings, I have shown four figures of a cowboy whirling his lasso. Since, in the illustrated embodiment of my invention, the film and the screen, for purposes of compactness, are not parallel when the apparatus is in use, the images thrown upon the screen are distorted as compared with the images on the film. I therefore, so distort the images on the film, as to counteract the said distorted effect, and thus cause the images on the screen to appear with less distortion or no distortion at all. In other words, the images on the film are distorted so as to counteract or control the distorted effect on the screen. In many instances, distortion may be made to contribute something to the animation of the picture. Therefore, my method of controlling distortion is very useful. Since, in the present instance, it is not desired to give the illusion of movement of the cowboy to different parts of the screen, but to depict him as standing in one spot, the images representing him are so placed with respect to their respective light bulbs, that the shadows fall at the same spot on the screen, and because the plate 17 directing the images is at an angle to the screen, the shadows of the images on the screen would be distorted if no provision were made to prevent such distortion. I have conceived that the images on the screen can be produced free from distortion by giving the images on the plate a counter-distortion which will be illuminated by the angularity between the plate and the screen. For instance, as may be seen in Fig. 8, the images of the cowboy on the plate, are tipped away from the center, and those images on the film which are furthest from the center are tipped the most. When, however, the shadows of the figures thus distorted, are thrown upon the screen by the respective light bulbs, the said shadows of the said figures, which, in this particular instance, always occur at the center of the screen, each depicts the cowboy as standing up straight and not leaning to either side. In order to project the images in the center of the screen, each electric bulb is not only displaced downward relative to the image which it is to project, but is also displaced laterally relative to said image to the center of the screen or other desired position. This feature of my invention makes it possible to place the electric light bulbs low down in the box, and enables the box to be much smaller and more compact than would otherwise be possible. It also enables an opaque screen, to be used, since the electric lights are located below the level of the screen, out of range of the vision of the observer.

The said feature of my invention would also enable the images to be thrown from the rear upon a translucent screen. Since in both of these arrangements, the electric lights are concealed, while the screen is fully exposed to view, an element of mystery is introduced which is intriguing.

In order to be able to light the bulbs in various orders, I have formed a commutator, as shown in Figs. 1 and 3, which has circular pathways 21, 22 and 23, formed in commutator blocks 24. Each of said commutator blocks is connected with one pole of one of the said electric bulbs, the other pole of each bulb being connected with an electric cord 25 which leads to a metallic pointer 26, having a handle 27. Batteries 28, 28 or other sources of electric current are introduced into the circuit thus formed. In the present instance, contact springs 29 and 30 are connected in the circuit and the batteries are interposed between the said springs.

The said batteries are held up against the rack 18 by lugs 19a, 19b and 19c.

In the instance chosen for illustration, each commutator block 24, carries a vertical pin 31 which extends down through openings in metallic plates 32, 33, 34 and 35, each of which has an ear 32a, 33a, 34a, or 35a which is connected with one of the electric light bulbs, 11A, 11B, 11C or 11D. When it is desired that the contact of the pointer 26 with a particular block, shall illuminate a particular one of the said lamps, the hole in that one of the plates 32, 33, 34 or 35, which is connected with the said electric light bulb is made small enough to fit firmly around and make electrical contact with the pin 31 of the said block, as for instance, the pin 31 of the block 23 in Fig. 6 which contacts with the plate 35. On the other hand, the holes in the other plates 32, 33 and 34 through which the said pin passes, are made large enough so that there is no contact between the said pin and the said plates.

Thus, by putting the pointer in one of the said circular pathways, and causing it to travel around the path, the bulbs can be lighted in a particular order according to the effect which it is desired to produce. For instance, in the inner circular pathway, 21, the connections are such as to make the bulbs light in the order 1—2—3—4. In the middle circular pathway, the connections are such as to make the bulbs light in the order 1—2—3—4—3—2—1—2—3—4. In the outer pathway, the connections are such as to make the bulbs light in the order 1—2—1—2—1—2—3—2—3—4—3—4—3—2—3—2—1. The effect of the inner pathway on the cowboy images is to make him appear to start whirling the lasso to one side of himself, and, while continuing the whirling, to carry the lasso over to the other side, by the time the fourth bulb has been lighted. The pictures then begin again at the first position to repeat in the same order to the fourth position.

When using the middle pathway, the cowboy goes through the motions just described, and, having reached the fourth attitude, he does not jump to the first position, but goes back to the third position, then to the second, and finally to the first position again.

In the outer circular pathway, the cowboy goes from the first to the second, third, second, third, fourth, third, second, third and back to the first, giving the impression of turning the lasso several times on one side and then several times on the other. All of these variations are obtained from the same four figures on the film, and, merely by lighting the figures in different orders.

The number of illusions of motion possible by the use of my commutator, increases in geometric ratio to the increase in the number of images; for instance, it is possible, to produce fifteen illusions of motion from a single film by the use of only four images. With ten lights and images, the number of changes possible increase to about fifty.

In order to increase the number of lights, they may be arranged in tiers or other relation, and the shadows made to fall in any desired relation to each other by placing each image on the film, in proper relation to its light bulb.

In inventing the aforesaid commutator, I have also accomplished what I regard as a very important improvement applicable to motion picture apparatus generally; namely, that I provide for changing from one picture to another, without shutting off the light. This is accomplished in the present instance by causing the commutator blocks to overlap each other at the joints between them. For instance, the joint 36 is made zigzag, as by providing projecting lugs 24a and 24b at each end, so that, before the pointer leaves one block entirely, it will have crossed a portion of the gap between it and the next block, and will be in contact with said next block; thus, before one image is extinguished, the next image is illuminated and then, when the first image goes out, it leaves no period of darkness.

The effect of this improvement is to cause the light to be continuous, and to eliminate the usual objectionable flicker. The illusion of motion is also heightened because changing from one image to another is a "flow" rather than a jump. As each image appears on the screen, a previous image is fading out, so that the eye carries an impression of the previous position while it is acquiring an impression of the new position, which is as near to the actual performance of the eye in observing the movement of live objects as it is possible to get mechanically. By projecting the images on the screen, from the front, instead of through it from the back, as might be done, a better impression is produced, and the same convenient and compact arrangement results.

By the use of my invention, a large variety of illusions of motion can be effected. The illusion of continuous progressive motion from one side of the screen to the other, as of animals or persons walking or running, or of inanimate objects such as a motorboat, a train, an aeroplane, an arrow, or other inanimate objects, or an object animated to resemble a human being or animal, can be effected by the successive projection of images so placed upon a film, and so designed as to cause the images on the screen, to replace each other at such points as will cause the illusion of continuity. This would be comparatively simple, if the movement across the screen could be accomplished in four jumps, but in the case of the camel shown in Fig. 10, it is necessary to depict at least, eight movements in order that the illusion may be reasonably consistent with the natural or normal slow speed of the object. This, I accomplish with the use, in the present instance, of only four lamps, by providing the film 17 with four groups of camels, numbered 1—2—3 and 4, as shown in Fig. 9, all of the camels of one of said groups being thrown upon the screen when the corresponding bulb is lighted. The camels of each group are so positioned on the film that the group of four camels is distributed nearly across the whole width of the screen. All of the camels in a single group are in the same attitude, and the attitude of each group differs from the one which preceded it, in that the new group of camels is one quarter of a step ahead of the group previously shown, and the attitude of its camels is made to conform to that in which the camel would be, before it had progressed one quarter of a step to the left. Thus, in Fig. 10, when the group of camels numbered "1" is thrown upon the screen, four camels appear, distributed across the screen, with all their feet on the ground. Group No. 1 is allowed to fade out as group No. 2 is thrown on, and the same four camels appear to have moved forward a quarter of their length and to have extended the left foreleg in the act of walking, a fifth camel appearing to enter the field from the right edge of the screen, and the first camel of group No. 2 appearing to begin to pass off the screen at the left. Similarly, when the light for group No. 2 has gone out, and the light for group No. 3 has been thrown on, the same four camels and the fifth one just coming on, at the right, appear to have progressed further to the left, and to have put the left foreleg down on the ground. Finally, the light of group No. 3 goes out and that of group No. 4 comes on, and the camels appear to have extended their right forelegs and placed them on the ground. The movement of the electric pointer 26, in its track in the commutator, now causes group No. 1 to succeed group No. 4, and the above stated succession of images of groups is repeated. It will be observed that groups No. 1 and 4 are so drawn that when the fourth group has been projected, and the light returns to the first group, the projection of the first group will be such as to continue the illusion of movement produced by the fourth group. The succession of groups from one to four, continuously repeated in that order produces the illusion of a continuous horizontal walking, and when the light returns to bulb No. 1, the position of the objects on this group is such as to project a group of images on the screen that will succeed group No. 4, just as group No. 2, succeeds group No. 1.

Thus, instead of depicting one camel walking across the screen, in four unnaturally long jumps, as would be the case if each lamp had only one camel to illuminate, I provide a plurality of camels, in the present instance, four, which are distributed across the screen, and cause each of the four camels to take four successive attitudes to make one complete step, with each pair of legs, and thus, without requiring any additional lamps, I am able to produce a much more natural and interesting illusion of motion than could be produced if each lamp illuminated an image of only one camel. And this is done without the movement of any part, except the pointer. It will be observed that by the projection of the said groups of images, in proper succession upon the screen, each projection succeeds the one ahead of it, so as both to depict the next phase of motion, and also to depict the object in the advanced position which the natural object would next take in its real or fancied movement. The illusion of progression is caused by the silhouette of each image replacing the image of the next one ahead of it, and the eye associates these successively replacing images as one moving image.

By an application of the same principle as just explained in connection with the production of the effect of the camels walking horizontally, the illusion of vertical and diagonal motion may also be produced. For instance, the illusion of falling rain or snow is an example of vertical motion, while the appearance of an aeroplane leaving the ground would be an example of diagonal motion. Both vertical and horizontal motion may be shown in the same picture and at the same time. Thus, the appearance of rain falling on a walking camel may be produced, thus giving the combination of horizontal and vertical motion. As an excellent example of continuous diagonal motion, a picture of an escalator may be produced. It would also be possible with this principle, to show the escalator with passengers aboard, going up or down.

By the term "film" as used in the specification and claims, is meant to include any translucent or transparent support upon which suitable pictures may be placed, such as the ordinary photographic film or plates, or translucent paper, or other suitable medium for carrying the images.

What I claim is:

1. In a motion-picture projecting apparatus, the combination of a screen, a plate having a plurality of images thereon, said plate being at an angle to said screen, and a series of lights some of which are off the vertical center of said screen adapted to throw shadows of said images on said screen, said images on said plate being so distorted as to throw undistorted shadows on said screen.

2. In a motion-picture projecting apparatus, the combination of a screen, a transparent plate having a plurality of images thereon, said plate being at an angle to said screen, and a series of lights some of which are off the vertical center of said screen adapted successively to throw shadows of said images on said screen, said images on said plate being so distorted as to throw undistorted shadows on said screen.

3. In a motion-picture projector, a box having electric lights therein, and having a screen projecting above said box in vertical position, a plate having images thereon, and a rack for holding said plate between said lights and said screen, said lights and images being in such relation that when thrown upon the screen their shadows shall overlap.

4. In a motion-picture projector, a box having electric lights therein, and having a screen projecting above said box in a vertical position, a plate having images thereon, and a rack for holding said plate between said lights and said screen, said lights and images being in such relation that when thrown upon the screen their shadows shall overlap, said plate, when so held, being inclined to the plane of said screen.

5. In a motion-picture projector, a comparatively shallow box having electric lights therein, and having a screen, and means for holding said screen in a vertical position when the box is horizontal, and a rack for holding a plate that is adapted to transmit light, said plate having images thereon, and being inclined to the plane of the said screen.

6. In a motion-picture projector, a comparatively shallow box having electric lights therein, and having a screen, and means for holding said screen in a vertical position relative to the bottom of said box, and a rack for holding a plate that is adapted to transmit light, said plate having figures thereon, and being inclined to the plane of the said screen, said figures being distorted so as to correct the distortion which would otherwise be produced in the shadows of said figures on said screen, by reason of the inclination of said plate to said screen.

7. In a motion-picture projector, a comparatively shallow box having electric lights therein, and having a screen, and means for holding said screen in a vertical position when the box is horizontal, and a rack for holding a plate that is adapted to transmit light, said plate having figures thereon, and being inclined to the plane of the said screen, said figures on said plate being so distorted so as to correct the distortion which would otherwise be produced, in the shadows of said figures on said screen, by reason of the inclination of said plate to said screen, said screen being adapted to be folded down upon said box to form a cover.

8. In a motion-picture projector, a comparatively shallow box having electric lights therein, and having a screen, and means for holding said screen in a vertical position when the box is horizontal, a plate that is adapted to transmit light, said plate having figures thereon, a rack for holding said plate in a position inclined to the plane of the said screen, said figures on said plate being distorted so as to correct the distortion which would otherwise be produced in the shadows of said figures on said screen, by reason of the inclination of said plate to said screen, said screen being adapted to be folded down upon said box to form a cover, said box having a short cover section hinged thereto, and adapted to fold down and extend over said electric lights.

9. In a motion-picture projector, the combination of a screen, a plurality of electric lights, a plate interposed between said lights and said screen, said plate having a group of similar figures for each light, the images of said groups successively representing the next phase of a desired motion and the advanced position which the natural object would take in said phase of motion.

10. In a motion-picture projector, the combination of a screen, a film having a plurality of images thereon, said images representing successive attitudes or positions of said images, and a plurality of electric lights, one for each of said images, and a commutator by which light is caused successively to shine through said images, the bars of said commutator being so constructed that light shall be increasing through one of said images while diminishing through another of said images.

11. In a motion-picture projector, the combination of a screen, a film having a plurality of images thereon, said images representing successive attitudes or positions of said images, and a plurality of electric lights for said images, and a commutator for said lights so arranged that light shall be thrown successively through said images upon said screen, and that while light through one image is decreasing, the light through the next successive image shall be increasing.

12. In a motion-picture projector, the combination of a screen, a film having a plurality of groups of images thereon, said images representing successive attitudes or positions of said images, and a plurality of electric lights, one for each of said groups of images and a commutator for such lights, such that light shall be thrown successively through said groups of images upon said screen and that while the light through one group of images is diminishing, the light through the next successive group of images shall be increasing.

13. A method of producing the illusion of motion of translation of an object across a screen, by light thrown through stationary images, comprising providing groups of similar figures, the images of said groups successively representing the next phase of the desired motion, and the advanced position which the natural object would take in said phase of motion, and throwing light from different light sources one for each image successively on said screen in overlapping relation through said groups in the order to effect the desired appearance of motion.

14. A method of producing the illusion of motion of translation of an object across a screen, by light thrown through stationary images, comprising providing groups of similar figures, the images of said groups successively representing the next phase of a desired motion and the advanced position which the natural object would take in said phase of motion, and throwing light from stationary sources of light successively on said screen in overlapping relation through said groups in the order to effect the desired appearance of motion.

15. In a motion-picture projector, a box having electric lights therein, and having a vertical screen, a plate having images thereon, and a rack for holding said plate between said lights and said screen.

16. In a motion-picture projector, a box having electric lights therein, and having a screen in a vertical position, a plate having images thereon, and a rack for holding said plate between said lights and said screen, said plate when so held, being inclined to the plane of said screen.

17. A method of producing the illusion of motion of translation of an object across a screen, by light thrown through images on an immovable film or plate, comprising providing groups of similar figures, the images of said groups successively representing the next phase of the desired motion, and the advanced position which the natural object would take in said phase of motion, and throwing light from a plurality of lights successively through said groups so as to cause the images of said groups to have overlapping relation in the order to effect the desired appearance of motion.

18. A method of producing the illusion of motion of translation of an object across a screen, by light thrown through images on an immovable film or plate, comprising providing groups of similar figures, the images of said groups successively representing the next phase of a desired motion and the advanced position which the natural object would take in said phase of motion, and throwing light from stationary sources of light successively through said groups so as to cause the images of said groups to have overlapping relation in the order to effect the desired appearance of motion.

WILLIAM N. (TAMPTON) AUBUCHON, Jr.